(12) United States Patent
Tran et al.

(10) Patent No.: US 7,330,936 B2
(45) Date of Patent: Feb. 12, 2008

(54) SYSTEM AND METHOD FOR POWER EFFICIENT MEMORY CACHING

(75) Inventors: Thang M. Tran, Austin, TX (US); Muralidharan S. Chinnakonda, Austin, TX (US); Rajinder P. Singh, Austin, TX (US)

(73) Assignee: Texas Instruments Incorporated, Dallas, TX (US)

( * ) Notice: Subject to any disclaimer, the term of this patent is extended or adjusted under 35 U.S.C. 154(b) by 197 days.

(21) Appl. No.: 11/109,163

(22) Filed: Apr. 19, 2005

(65) Prior Publication Data

US 2006/0047884 A1  Mar. 2, 2006

Related U.S. Application Data

(60) Provisional application No. 60/606,073, filed on Aug. 30, 2004.

(51) Int. Cl.
*G06F 12/08* (2006.01)
(52) U.S. Cl. ........................ 711/128; 711/208
(58) Field of Classification Search ................ 711/123, 711/128, 207, 216
See application file for complete search history.

(56) References Cited

U.S. PATENT DOCUMENTS 6,253,285 B1 * 6/2001 Razdan et al. .............. 711/118

2001/0052052 A1 * 12/2001 Peng ........................... 711/133

OTHER PUBLICATIONS

"Cache Mapping and Associativity" on line at: http://www.laynetworks.com/Cache%20Mapping%20and%20Associativity.htm, © 2000-2004 Lay Networks, last visited Apr. 8, 2005, 2 pgs.
"Direct Mapped Cache," on line at: http://www.laynetworks.com/Direct%20Mapped%20Cache.htm#, © 2000-2004 Lay Networks, last visited Apr. 8, 2005, 4 pgs.
Moritz, Csaba A. et al., "Hot Pages: Software Caching for Raw Microprocessors," MIT-LCS Technical Memo LCS-TM-599, Aug. 1999, 12 pgs.

* cited by examiner

*Primary Examiner*—B. James Peikari
(74) *Attorney, Agent, or Firm*—Ronald O. Neerings; Wade James Brady, III; Frederick J. Telecky, Jr.

(57) ABSTRACT

A system and method for power efficient memory caching. Some illustrative embodiments may include a system comprising: a hash address generator coupled to an address bus (the hash address generator converts a bus address present on the address bus into a current hashed address); a cache memory coupled to the address bus (the cache memory comprises a tag stored in one of a plurality of tag cache ways and data stored in one of a plurality of data cache ways); and a hash memory coupled to the address bus (the hash memory comprises a saved hashed address, the saved hashed address associated with the data and the tag). Less than all of the plurality of tag cache ways are enabled when the current hashed address matches the saved hashed addresses. An enabled tag cache way comprises the tag.

18 Claims, 4 Drawing Sheets

SYSTEM AND METHOD FOR POWER EFFICIENT MEMORY CACHING

CROSS-REFERENCE TO RELATED APPLICATIONS

This application is a non-provisional application claiming priority to U.S. Provisional Application Ser. No. 60/606,073, filed on Aug. 30, 2004, and entitled "Power efficient method for selecting data way in a high performance processor," which is hereby incorporated by reference.

BACKGROUND

On-chip caches are used in various microprocessor designs to improve performance by storing frequently used information in fast, on-chip memories. Performance is improved because information can be retrieved quickly during program execution. Various types of cache architectures exist. Direct mapped caches, for example, always map a location in main memory to the same location in the cache memory. Whether or not the desired data is in the cache (a "hit") or not (a "miss") is determined by looking at a particular location in the cache memory, given a particular main memory address. By contrast, fully associative caches allow a location in main memory to be mapped to any location within the cache memory. In order to determine whether or not a cache hit or miss has occurred, a fully associated cache memory must be searched. If the entire cache is in use, it may be necessary to search the entire cache. Direct mapped caches have higher search speeds than fully associative caches. Fully associative caches have higher hit/miss ratios than direct mapped caches.

An alternative cache architecture that strikes a balance between a direct mapped and a fully associative cache is an N-Way set associative cache. In such a cache design a particular memory location maps to a group or "set" of cache locations, any one of which may be used to cache the data for a particular location in main memory. To determine if a hit or miss has occurred, only those locations within the set corresponding to the mapped main memory address need be searched. By varying the value of "N" (the number of sets) a desired balance can be achieved between the speed of the search and the hit/miss ratio.

To improve search speeds in an N-Way set associative cache, the main memory addresses of the cached data stored within a set may simultaneously be accessed and compared with the desired address, thus avoiding having to search the set. This can be accomplished by subdividing the cache memory into sub-arrays, each sub-array comprising one element of any given set. The N memory sub-arrays within the cache (representing the N "Ways" of the cache) are accessed simultaneously with each memory access. Thus, even though data from only one Way may be used, all N Ways must be accessed in order to read data that is stored in the cache (a hit). Accessing all N-Ways in this manner can result in significant power consumption, which can be problematic for a battery-operated device.

SUMMARY

The present disclosure describes a system and method for power efficient memory caching. Some illustrative embodiments may include a system comprising: a hash address generator coupled to an address bus (the hash address generator converts a bus address present on the address bus into a current hashed address); a cache memory coupled to the address bus (the cache memory comprises a tag stored in one of a plurality of tag cache ways and data stored in one of a plurality of data cache ways); and a hash memory coupled to the address bus (the hash memory comprises a saved hashed address, the saved hashed address associated with the data and the tag). Less than all of the plurality of tag cache ways are enabled if the current hashed address matches the saved hashed address. An enabled tag cache way comprises the tag.

Other illustrative embodiments may include a processor comprising a processor core, and an internal cache memory system coupled to the processor core. The internal cache memory system may further comprise: a hash code generator coupled to an address bus (the hash code generator produces a current hash code based on a bus address present on the address bus); a cache memory coupled to the address bus (the cache memory comprising: a plurality of data cache arrays that comprises data; and a plurality of tag cache arrays that comprise a tag); and a hash memory coupled to the address bus (the hash memory comprising a saved hash code). Less than all of the plurality of tag cache arrays are enabled when a comparison of the current hash code and the saved hash code results in a match. An enabled tag cache array comprises the tag.

Yet other illustrative embodiments may include a method, comprising: generating a current hash code by logically combining a plurality of address bits of a cache address; reading a plurality of stored hash codes from a plurality of hash cache ways; identifying a possible cache hit if the current hash code matches one of the plurality of stored hash codes; and enabling less than all of a plurality of tag cache ways if the possible cache hit is identified, the plurality of tag cache ways comprising a plurality of tags.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following discussion and claims to refer to particular system components. This document does not intend to distinguish between components that differ in name but not function.

In the following discussion and in the claims, the terms "including" and "comprising" are used in an open-ended fashion, and thus should be interpreted to mean "including but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections. Additionally, the term "system" refers to a collection of two or more parts and may be used to refer to a memory cache, computer or communication system or a portion of a memory cache, computer or communication system.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims, is limited to that embodiment.

Figure 1:
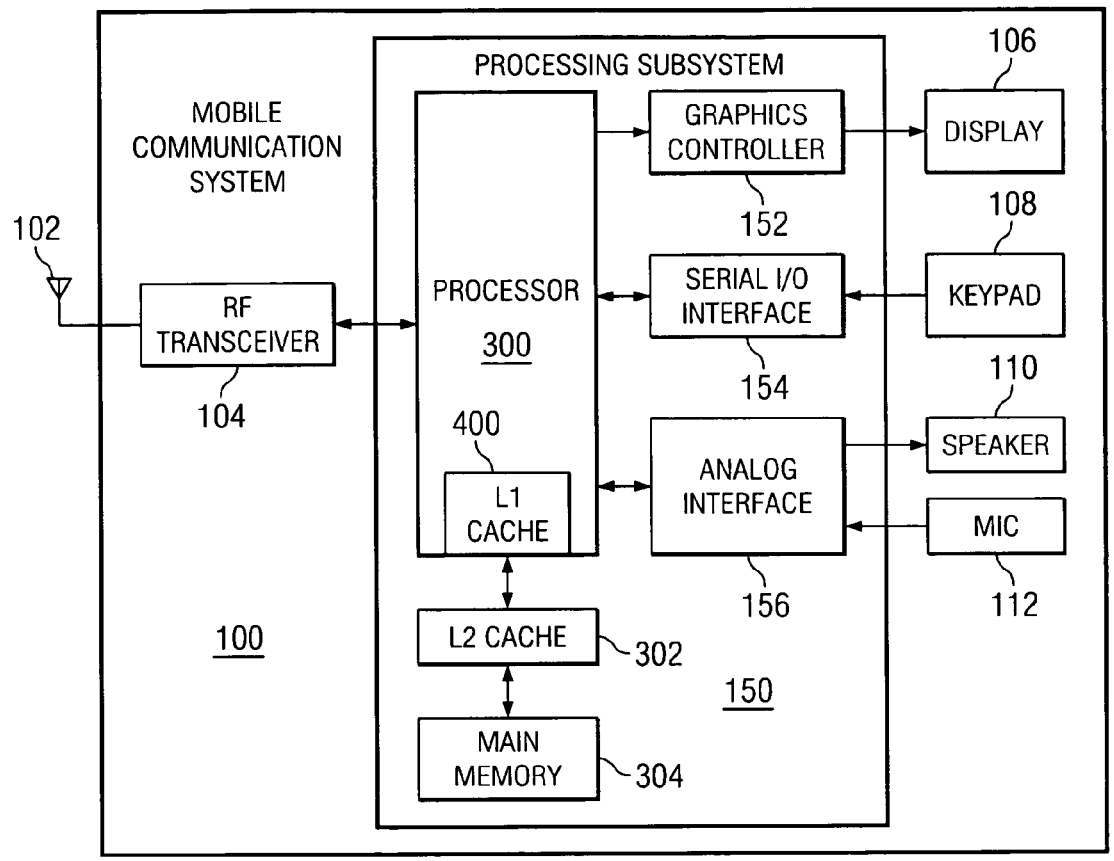
FIG. 1 illustrates a mobile communication system comprising a cache memory system constructed in accordance with at least some preferred embodiments.

Microprocessor-based systems sometimes include memory-caching systems that serve to improve the overall performance of the system. This is accomplished by allowing a processor to access information stored in memories that are generally faster, but smaller, than the main memory of the system. FIG. 1 illustrates such a memory-caching system in the context of a mobile communication system (e.g., a cellular telephone), although this disclosure is not limited to communication systems and/or mobile systems. Mobile communication system 100 comprises a radio frequency (RF) antenna 102, an RF transceiver 104, a display 106, a keypad 108, a speaker 110, a microphone 112, and a processing subsystem 150. Processing subsystem 150 comprises processor 300, a level-2 (L2) cache 302, main memory 304, graphics controller 152, serial input/output (I/O) interface (I/F) 154 and analog I/F 156. Processor 300 further comprises a level-1 (L1) cache 400 constructed in accordance with at least some of the preferred embodiments.

Figure 2:
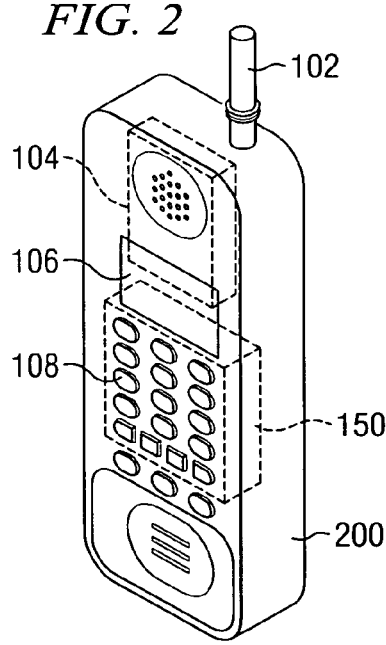
FIG. 2 illustrates a battery operated mobile communication device comprising a processing subsystem that includes a cache memory system constructed in accordance with at least some preferred embodiments.

Radio signals are received and transmitted through the antenna 102, which couples to RF transceiver 104. RF transceiver 104 couples to processor 300 and amplifies both received RF signals that are processed by processor 300, as well as transmitted signals generated by processor 300. Processor 300 may display information to a user via graphics controller 152 and display 106, and may accept commands and other information from a user via serial I/O I/F 154 and keypad 108. The processor 300 may provide audio information to the user (via analog I/F 156 and speaker 110), and may also accept audio for RF transmission (via microphone 112 and analog I/F 156). FIG. 2 illustrates how these components may be physically incorporated into a battery-operated, mobile communication device 200, such as a cellular telephone.

Referring again to FIG. 1, the processor 300 may interact with a multi-level, cache memory system. In the preferred embodiment shown there are three levels of memory: main memory 304 (the slowest), L2 cache 302 (faster and smaller than, and coupled to, main memory 304), and L1 cache 400 (faster and smaller than both main memory 304 and L2 cache 302, and coupled to L2 cache 302). When the processor 300 needs to access an instruction or data from memory, it will first attempt to find the needed instruction or data in the L1 cache 400. If the instruction or data is not found in the L1 cache 400, the processor 300 may then attempt to locate the instruction or data in the L2 cache 302. If found in the L2 cache 302, the L1 cache 400 may be updated to include the instruction or data (making it available for subsequent use), and the processor 300 may then proceed with processing. If the instruction or data is not found in the L2 cache 302, the processor may then access the data directly in main memory 304. The L1 cache 400 and L2 cache 302 may then be updated to include the instruction or data accessed in main memory 304.

Figure 3:
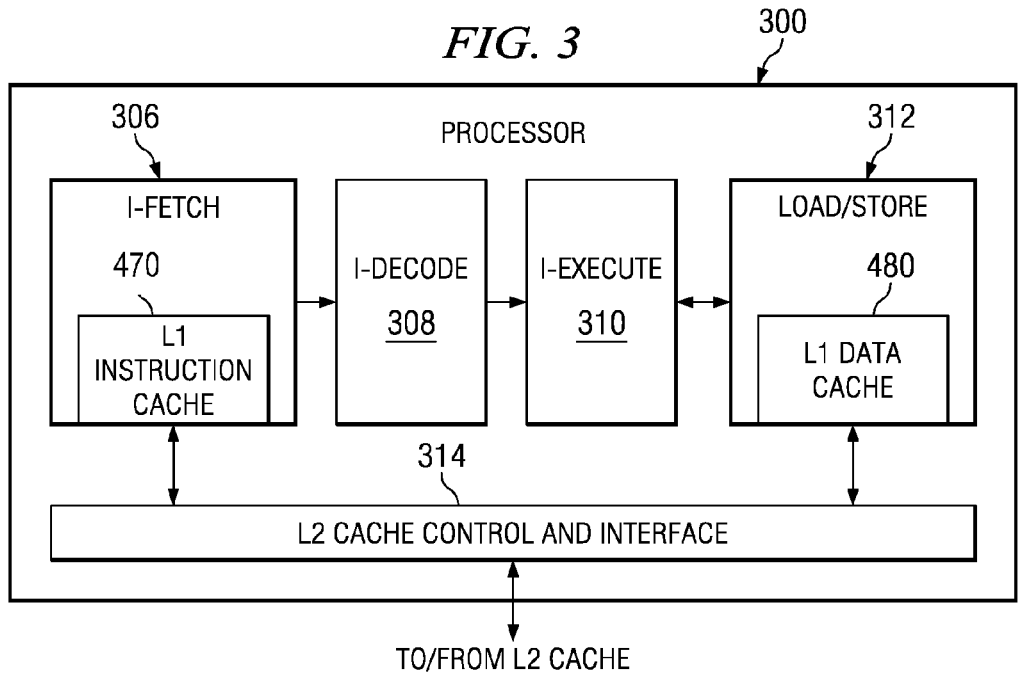
FIG. 3 illustrates a processor comprising a cache memory system constructed in accordance with at least some preferred embodiments.
Figure 4:
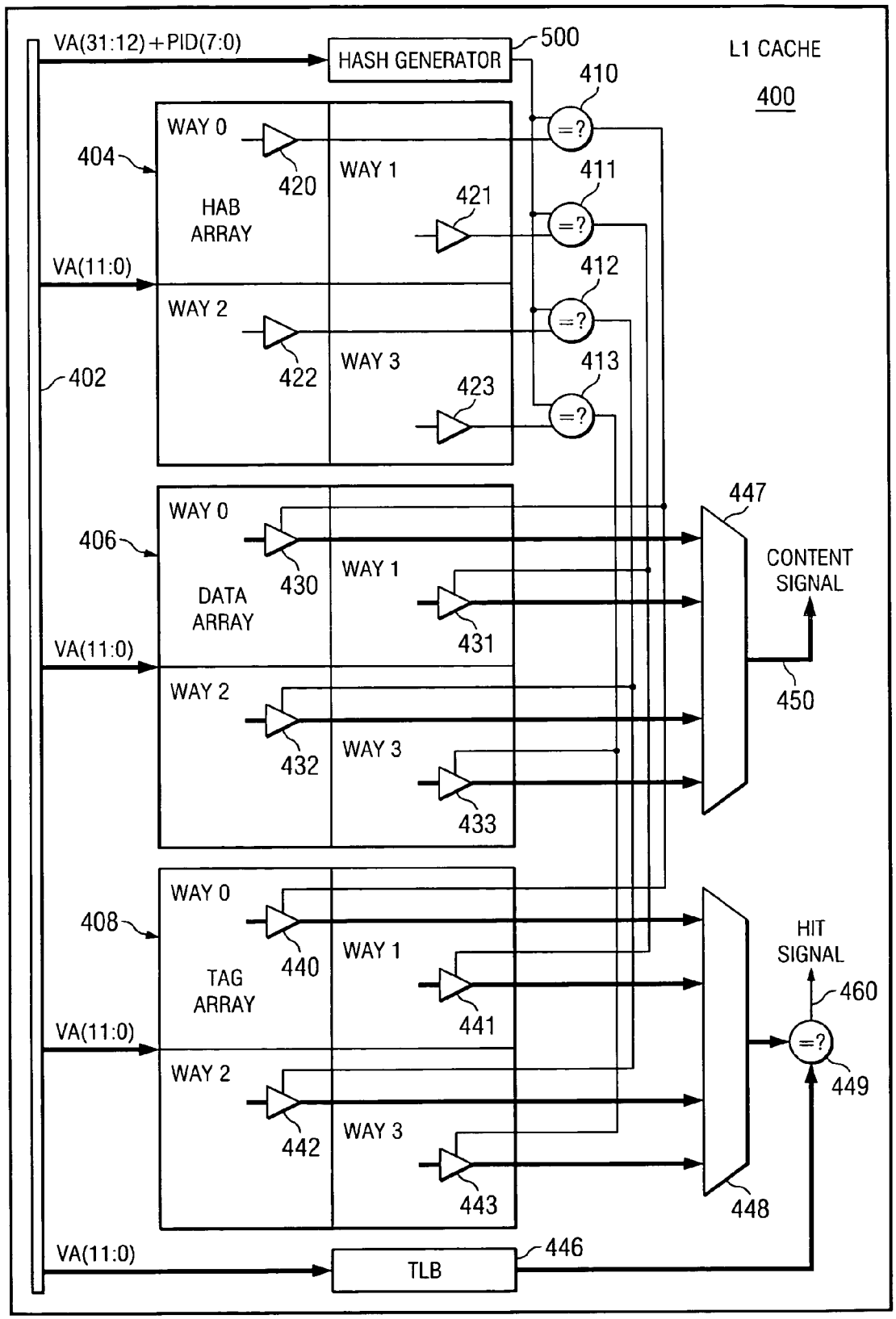
FIG. 4 illustrates a cache memory system constructed in accordance with at least some preferred embodiments.

FIG. 4 illustrates an L1 cache 400 constructed in accordance with at least some preferred embodiments. The components of the L1 cache 400 shown are common to both the L1 instruction cache 470 and the L1 data cache 480 (FIG. 3). The L1 cache 400 of FIG. 4 comprises address bus 402, which couples to Hash Address Buffer (HAB Array) 404, data memory (Data Array) 406, tag memory (Tag Array) 408, translation look-aside buffer (TLB) 446, and hash generator 500. Data Array 406 may comprise a memory array that stores the cached information (e.g., data or instructions). Tag Array 408 may also comprise a memory array, which may be used to store information that describes the origin and status of the information stored in Data Array 406. Each entry in Tag Array 408 may correspond to an entry or group of entries in Data Array 406. The information in Tag Array 408 may include an address corresponding to the location in main memory 304 (FIG. 1) from where the cached information stored in Data Array 406 originated and is ultimately stored.

Figure 5:
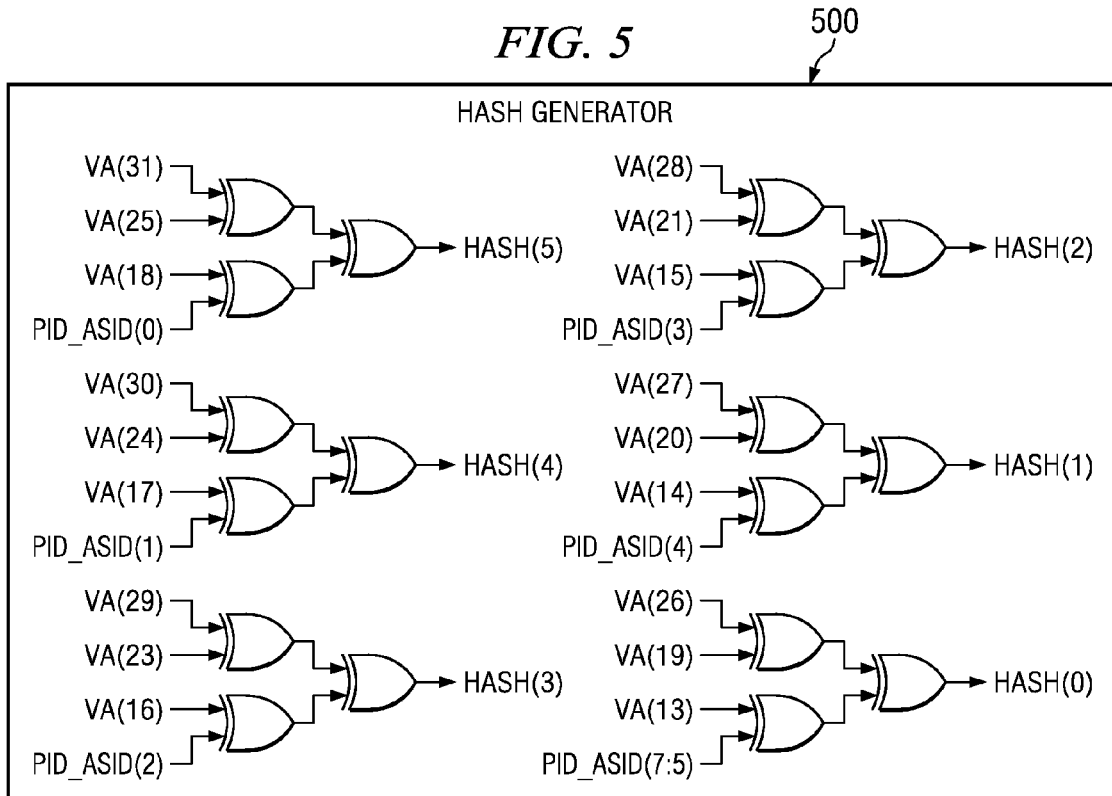
FIG. 5 illustrates a hash code generator configured to operate within a cache memory system constructed in accordance with at least some preferred embodiments.

The HAB Array 404 may comprise a memory array that stores "hashed" address entries, wherein each hashed address entry corresponds to an entry in both Data Array 406 and Tag Array 408. Hashing refers to a process that converts a source numerical value from a large domain into a hashed numerical value constrained to a smaller range. A single hashed value may thus result from any number of different source values. In the preferred embodiments described, a one-to-many relationship may exist between a hashed address stored in the HAB Array 404 and a set of source addresses that may be stored in Tag Array 408. The set of source addresses may be represented by the hashed address. A portion of the address present on the address bus 402 may be used to generate a hashed address comprising significantly fewer bits than the number of bits used to generate the hashed address. This may be done by selectively combining address bits through a series of logical "exclusive or" (XOR) combinations. FIG. 5 illustrates an exemplary combination of bits, wherein 18 of the 20 most significant bits of a 32-bit virtual address (VA) and 8 process ID/application source ID (PID_ASID) bits are "hashed" together to generate a 6-bit hash code. The choice of hash function will vary, and may depend on such factors as overall processor architecture, process sizes, and address mappings. The hash function illustrated in FIG. 5 is just one of numerous functions that may be used, and the preferred embodiments are not intended to be limited to any one particular function or embodiment.

The exemplary hash function of FIG. 5 may be implemented by combining groups of bits using two levels of XOR gates, wherein each group combines to produce one bit of the hash code. Thus, for example, VA(31) and VA(25) are XOR'd together, as are VA(18) and PID_ASID(0), and the results of the two XOR operations are in turn combined by another XOR gate, producing Hash(5). Similar operations are performed on other VA and PID_ASID bits. The resulting 6-bit hash code acts as a fingerprint that identifies an address as belonging to a group of addresses that share a common fingerprint. Thus, if two hash codes do not match, the addresses that generated the two hash codes are known not to match. But if two hash codes do match, the two addresses that produced the same hash code may match, but are not known with certainty to match. Within the context of the L1 Cache 100, a hash code match thus represents a possible cache hit, since it is possible, but not known to a certainty, that the two addresses that produced the same hash code may match.

Referring again to FIG. 4, when information is initially written to the L1 Cache 400, the information is stored within Data Array 406, the main memory address of the origin of the information is stored within Tag Array 408, and the 6-bit hash code representing a portion of the address present on address bus 402 is stored in HAB Array 404. Later, when the processor 300 accesses the stored information (an instruction or data), the corresponding hashed address stored in HAB Array 404 is read and compared to the hashed portion of the address currently present on address bus 402. Hash generator 500, which implements the same exclusive OR function previously described and illustrated in FIG. 5, performs the hashing of the address on the bus. If the stored hashed address matches the hashed address from hash generator 500, the information needed by the processor 300 may be stored in Data Array 406 of the L1 Cache 400. However, if the stored hashed address does not match the generated address, then the needed information is not in the L1 cache 400, and the L2 cache must now be accessed.

The comparison between the stored hashed address and the hashed address from hash generator 500 is performed by address comparators 410 through 413. The hash generator 500 and HAB Array 404 both couple to the comparators, but the HAB Array 404 has four individual output paths that each couple to a comparator, whereas hash generator 500 has a single output path that couples to all four of the comparators. The four output paths from the HAB Array 404 each originate from one of four sub-arrays referred to as "Ways". Each Way comprises a distinct region or sub-array within the memory array of HAB Array 404. Ways may be selectively read to conserve power, or read concurrently to access multiple data paths in parallel and improve performance. Both the Data Array 406 and the Tag Array 408 also comprise Ways and have the same number of Ways in their memory arrays as the HAB Array 404 (four Ways in the preferred embodiment illustrated in FIG. 4, implementing a 4-way, set-associative cache memory).

When an address is presented on the address bus 402, memory locations corresponding to the address are made accessible in all of the Ways of the HAB Array 404, Data Array 406, and Tag Array 408, though initially only the HAB array 404 is actually accessed. Actual access of a Way may be accomplished by enabling sense amplifiers corresponding to that Way within a given memory array (HAB, Data, or Tag). The HAB Array 404 comprises four sets of hash sense amplifiers 420 through 423, each set corresponding to a Way. Similarly, Data Array 406 comprises data sense amplifiers 430 through 433, and Tag Array 408 comprises tag sense amplifiers 440 through 443.

The hash sense amplifiers 420 through 423 of the HAB Array 404 are always enabled, which results in data being read from all Ways of the HAB Array 404 memory array whenever an address is presented to the array. This permits hashed addresses from all of the Ways of the HAB Array 404 to be concurrently presented to the comparators 410 through 413. Although all of the Ways of the HAB are accessed together, using a relatively small number of bits for the hash code, as compared to the total number of bits for the data and tag information, reduces the power consumption incurred by accessing the HAB.

Each hashed address is contemporaneously compared with the hashed address originating from hash generator 500. If any of the stored hashed addresses match the hashed address from the hash generator 500, then a possible hit has been detected and Data Array 406 may contain the information required by the processor 300. Each of the comparators 410 through 413 couples to the sense amplifiers for a Way of both Data Array 406 and Tag Array 408, and each corresponds to the Way of the HAB Array 404 coupled to a particular comparator. Thus, for example, Way 0 of the HAB Array 404 couples to comparator 410, which in turn couples to sense amplifiers 430 (corresponding to Way 0 of Data Array 406) and to sense amplifiers 440 (corresponding to Way 0 of Tag Array 408).

The output signal generated by each comparator drives an enable control node on each of the sense amplifiers. If any one of the comparators 410 through 413 detects that there is a hashed address match for a given Way, the output signal from the comparator will enable the sense amplifiers for the corresponding Way in both Data Array 406 and Tag Array 408, resulting in a read of information stored in Data Array 406 and Tag Array 408. In this manner only the Way potentially comprising the desired information is read. By only enabling and reading data through sense amplifiers that are coupled to smaller sub-arrays, rather than coupled to the full memory array, the sense amplifiers of the preferred embodiments consume less power than would sense amplifiers coupled to all associative ways of the memory arrays.

Each of the data sense amplifiers 430-433 in Data Array 406 couple to data-select multiplexer (Data MUX) 447. The output signal from Data MUX 447 (Content Signal 450) is the information presented to the processor (instruction or data) from the selected Way. Each of the tag sense amplifiers 440-443 couple to tag-select multiplexer (Tag MUX) 448. Tag MUX 448 couples to physical address comparator 449, providing the comparator with a stored physical address from Tag Array 408. TLB 446 also couples to physical address comparator 449, providing a physical address that is compared with the stored physical address from Tag Array 408. The physical address provided by TLB 446 is mapped from a virtual address present on address bus 403. The mapping is performed in parallel to the accesses to the Ways of the HAB, Data, and Tag arrays such that an accessed physical address from the Tag Array 408 and a physical address provided by the TLB 446 may be contemporaneously presented to the physical address comparator 449 when a possible hit is detected. Physical address comparator 449 asserts Hit Signal 460 if the stored physical address from TAG Array 408 matches the physical address provided by TLB 446. If a hit is indicated, the information stored in Data Array 406 is the desired data, and the processor 300 may operate on the instruction or data thus accessed within the L1 cache 400.

It should be noted that although the TLB 446 is accessed in parallel with the accesses to the other arrays, the address read from the TLB 446 is not required until after the other arrays have been accessed, the possible hit detection has been made, and a physical address has been read from the Tag Array 408. Because the TLB 446 is not part of a critical speed path, it may be designed to operate at a slower speed than the other arrays. By operating the TLB 446 at a slower speed, additional power savings may be achieved.

The preferred embodiments of the preceding paragraphs are described within the context of processing sub-system 150 that implements a virtual addressing system. As noted, the hash code is based at least in part on portions of a virtual address, but the address stored in Tag Array 408, as well as that derived by TLB 446, is a physical address. The L1 cache of the preferred embodiments may also be incorporated into a processing sub-system 150 that implements a direct addressing system, wherein the hash code is based at least in part on portions of a physical address, rather than a virtual address, presented on address bus 402 of FIG. 4. TLB 446 would not exist in such a system, and address bus 402 would couple to physical address comparator 449. Such an alternative embodiment of the system would otherwise operate as previously described.

Figure 6:
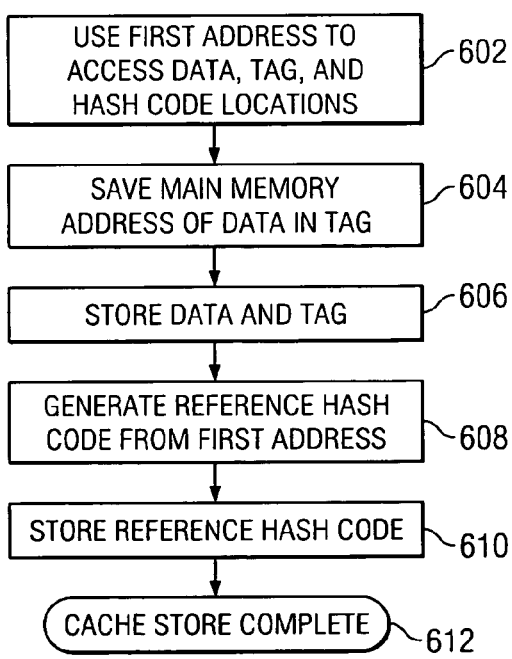
FIG. 6 illustrates a method for storing data, tag and a hash code within a cache memory system in accordance with at least some preferred embodiments.

FIG. 6 illustrates a method for storing information in a cache memory system, in accordance with at least some preferred embodiments. A first address is used to access locations for storing the data, a tag corresponding to the data, and a hash code (block 602). The address corresponding to the location in main memory of a copy of the data is saved within the tag (block 604), and both the data and the tag are saved in the cache memory system (block 606). A reference hash code is generated from the first address in block 608, and stored in the cache memory system in block 610, completing the cache storing method (block 612).

Figure 7A:
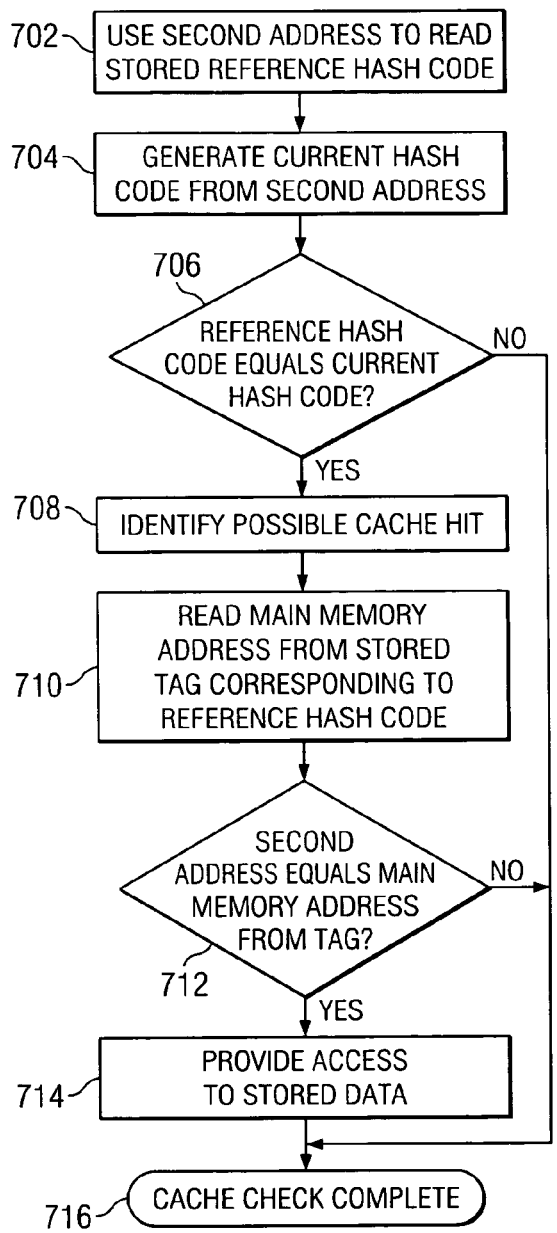
FIG. 7A illustrates a method for utilizing a stored tag and hash code to determine a cache memory hit in accordance with at least some preferred embodiments.

FIG. 7A illustrates a method for checking a cache memory system for previously stored information, in accordance with at least some preferred embodiments. A second address is used to read the stored reference hash code in block 702. A current hash code is then generated from the second address in block 704, and compared against the stored reference hash code in block 706. If the reference and current hash codes do not match, the data associated with the stored reference hash code is not the data needed (a cache miss), and the cache check is complete (block 716). If the reference and current hash codes do match, a possible cache hit is identified as shown in block 708. The main memory address of the data stored in the tag and corresponding to the reference hash code is read in block 710 and compared with the second address in block 712. If the main memory address and the second address do not match, the data associated with the stored reference hash code is not the data needed (a cache miss), and the cache check is complete (block 716). If the main memory address and the second address do match, a cache hit has been identified, access to the data is provided as shown in block 714, and the cache check is complete (block 716).

Figure 7B:
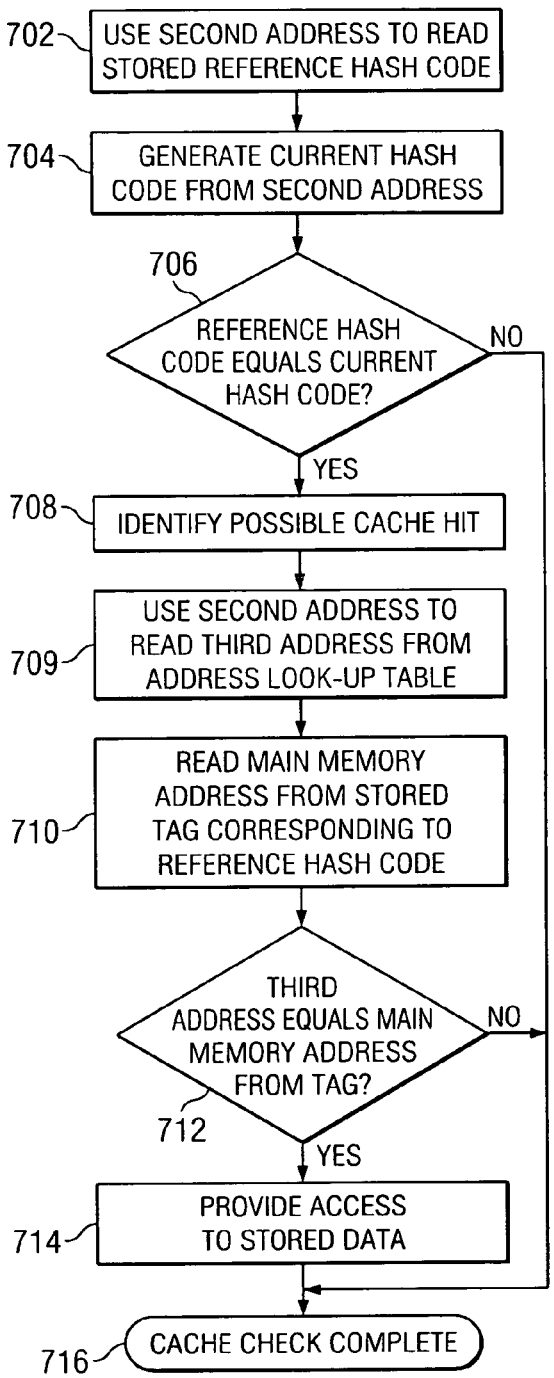
FIG. 7B illustrates a method for utilizing a stored tag and hash code, as well as an address look-up table, to determine a cache memory hit in accordance with at least some preferred embodiments.

FIG. 7B illustrates an alternative method for checking a cache memory system for previously stored data, in accordance with at least some preferred embodiments. The method shown is substantially similar to the method illustrated in FIG. 7A and described above, except that after a possible cache hit is identified in block 708, the second address is used to read a third address from an address look-up table in block 709. Once the third address has been generated, it is later used (instead of the second address) in the comparison with the main memory address from the tag (block 712). The look-up table of block 709 may be implemented, for example, as a translation look-aside buffer (TLB), which may be used to convert a virtual address into a physical address. The use of a TLB may permit systems that implement virtual addressing to use the memory caching method of FIG. 7B.

The methods illustrated in FIGS. 6, 7A and 7B refer to data that is part of the information stored within the cache memory system. It is noted that data is intended to refer to both data within a data cache memory system, as well as instructions within an instruction cache system. It may become apparent to those skilled in the art that other forms of information may also be stored and retrieved by the methods herein describe, and it is intended that the methods described apply to all such forms of information.

The above disclosure is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a hash address generator coupled to an address bus, the hash address generator converts a bus address present on the address bus into a current hashed address;
a cache memory coupled to the address bus, the cache memory comprises a tag stored in one of a plurality of tag cache ways and data stored in one of a plurality of data cache ways; and
a hash memory coupled to the address bus, the hash memory comprises a saved hashed address, the saved hashed address associated with the data and the tag;
wherein less than all of the plurality of tag cache ways are enabled when the current hashed address matches the saved hashed address; and
wherein an enabled tag cache way comprises the tag.

2. The system of claim 1,
wherein less than all of the plurality of data cache ways are enabled when the current hashed address matches the saved hashed address; and
wherein an enabled data cache way comprises the data.

3. The system of claim 1,
wherein the tag comprises a saved main memory address of a copy of the data, the copy of the data stored in an external main memory; and
wherein the data stored in the cache memory is accessed if the bus address matches the saved main memory address.

4. The system of claim 1, further comprising:
a translation look aside buffer (TLB) coupled to the address bus;
wherein the bus address is a virtual address; and
wherein the TLB generates a physical address from the virtual address.

5. The system of claim 4,
wherein the tag comprises a saved main memory address of a copy of the data, the copy of the data stored in an external main memory; and
wherein the data is accessed if the physical address matches the saved main memory address.

6. The system of claim 1,
wherein the cache memory comprises a data array and a tag array;
wherein the data array comprises a plurality of data cache ways; and
wherein the tag array comprises the plurality of tag cache ways.

7. The system of claim 1,
wherein the hash memory is organized as a plurality of hash ways;
wherein the plurality of hash ways are enabled when the current hashed address is compared against the saved hashed address; and
wherein a hash way of the plurality of hash ways comprises the saved hashed address.

8. The system of claim 1, wherein the system is a communication device.

9. The system of claim 1, wherein the system is a memory cache controller.

10. A processor, comprising:
a processor core; and
an internal cache memory system coupled to the processor core, the internal cache memory system comprising:
  a hash code generator coupled to an address bus, the hash code generator produces a current hash code based on a bus address present on the address bus;
  a cache memory coupled to the address bus, the cache memory comprising:
    a plurality of data cache arrays that comprises data; and
    a plurality of tag cache arrays that comprise a tag; and
  a hash memory coupled to the address bus, the hash memory comprising a saved hash code;
wherein less than all of the plurality of tag cache arrays are enabled when a comparison of the current hash code and the saved hash code results in a match; and
wherein an enabled tag cache array comprises the tag.

11. The processor of claim 10,
wherein less than all of the plurality of data cache arrays are enabled when a comparison of the current hash code and the saved hash code results in a match; and
wherein an enabled data cache array comprises the data.

12. The processor of claim 10, further comprising:
an interface to an external main memory, the interface coupled to the internal cache memory system;
wherein the tag comprises a saved main memory address of a copy of the data, the copy of the data stored in the external main memory; and
wherein the data is accessed if the bus address matches the saved main memory address.

13. The processor of claim 10, further comprising:
a translation look aside buffer (TLB) coupled to the address bus;
wherein the bus address is a virtual address; and
wherein the TLB generates a physical address from the virtual address.

14. The processor of claim 13, further comprising:
an interface to an external main memory, the interface coupled to the internal cache memory system;
wherein the tag comprises a saved main memory address of a copy of the data, the copy of the data stored in the external main memory; and
wherein the data is accessed if the physical address matches the saved main memory address.

15. The processor of claim 10,
wherein the hash memory is organized as a plurality of hash arrays;
wherein the plurality of hash arrays are enabled when the current hash code is compared against the saved hash code; and
wherein a hash array of the plurality of hash arrays comprises the saved hash code.

16. A method, comprising:
generating a current hash code by logically combining a plurality of address bits of a cache address;
reading a plurality of stored hash codes from a plurality of hash cache ways;
identifying a possible cache hit if the current hash code matches one of the plurality of stored hash codes; and
enabling less than all of a plurality of tag cache ways if the possible cache hit is identified, the plurality of tag cache ways comprising a plurality of tags.

17. The method of claim 16, further comprising:
enabling less than all of a plurality of data cache ways if the possible cache hit is identified, the plurality of data cache ways comprising a plurality of data elements;
comparing the cache address with a main memory address stored within a tag of the plurality of tags, if the possible cache hit is identified; and
providing access to a data element of the plurality of data elements if comparing the cache address with the main memory address results in a match.

18. The method of claim 16, further comprising:
using the cache address to access an address look-up table and reading a translated address stored in the address look-up table, if the possible cache hit is identified;
comparing the translated address with the main memory address stored within a tag of the plurality of tags, if the possible cache hit is identified; and
providing access to a data element of the plurality of data elements if comparing the translated address with the main memory address results in a match.

* * * * *